United States Patent
Matsumoto et al.

(10) Patent No.: US 6,240,156 B1
(45) Date of Patent: May 29, 2001

(54) TOP GUIDE GRID ATTACHMENT FOR A BOILING WATER REACTOR

(75) Inventors: Jack T. Matsumoto, Sunnyvale; Alex B. Fife, San Jose, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/096,675

(22) Filed: Jun. 12, 1998

Related U.S. Application Data

(60) Provisional application No. 60/057,576, filed on Aug. 29, 1997.

(51) Int. Cl.$^7$ .................................................... G21C 19/00
(52) U.S. Cl. .................... 376/462; 376/438; 376/260; 411/75; 411/77; 411/80
(58) Field of Search .................... 370/438, 462, 370/460; 411/75, 77, 80

(56) References Cited

U.S. PATENT DOCUMENTS

| | | | | |
|---|---|---|---|---|
| 2,547,789 | * | 4/1951 | Skeel | 411/80 |
| 2,709,059 | * | 5/1955 | Lear et al. | 411/80 |
| 3,421,726 | * | 1/1969 | Getter | 411/80 |
| 4,021,204 | * | 5/1977 | Straffi | 29/157.3 R |
| 4,371,035 | * | 2/1983 | Soligno | 165/162 |
| 5,584,464 | * | 12/1996 | Whittaker | 411/80 |
| 5,838,751 | * | 11/1998 | Thompson et al. | 376/260 |
| 6,009,137 | * | 12/1999 | Matsumoto et al. | 376/302 |

FOREIGN PATENT DOCUMENTS

| | | | | |
|---|---|---|---|---|
| 208951 | * | 8/1956 | (AT) | 411/80 |
| 1488523 | * | 7/1967 | (FR) | 376/462 |
| 60-185192 | * | 9/1985 | (JP) | 376/462 |

* cited by examiner

Primary Examiner—Michael J. Carone
Assistant Examiner—Jack Keith
(74) Attorney, Agent, or Firm—Armstrong Teasdale LLP

(57) ABSTRACT

A top guide assembly for securing a top guide to a shroud which enables the top guide to be remotely removed without removing any other parts of the shroud or the core support structure is described. In one embodiment, the top guide assembly includes a hanger for being secured in a groove formed in an inner surface of the shroud, and the hanger includes a ledge having a plurality of openings therein. The top guide rests on an upper surface of the ledge. The assembly also includes wedges for being positioned in pockets formed in the top guide and tightly fit between the hanger and the top guide, and threaded studs for extend through respective aligned bores in the wedges and openings in the ledge. A nut and a keeper are engaged to one end of each stud to retain the wedge between the hanger and the top guide grid.

11 Claims, 4 Drawing Sheets

TOP GUIDE GRID ATTACHMENT FOR A BOILING WATER REACTOR

CROSS REFERENCE TO RELATED APPLICATIONS

This application claims the benefit of U.S. Provisional Application No. 60/057,576, filed Aug. 29, 1997.

FIELD OF THE INVENTION

This invention relates generally to boiling water reactors and more particularly, to securing a top guide grid to a shroud of such a reactor.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The top guide includes several openings formed by cross members, sometimes collectively referred to as a grid, and fuel bundles are inserted through the openings and are supported by the core plate. The top guide is supported vertically and horizontally by the shroud, and the top guide grid restrains horizontal movement of the upper ends of the fuel assemblies. Under normal operating conditions, there are no substantial vertical loads applied to the grid.

Irradiation is know to assist in the cracking of some BWR materials. The grid is located in a high fluence region and may be susceptible to irradiated assisted stress corrosion cracking (IASCC). The core support structure is exposed to the highest fluence. The core plate also is in a high fluence region and may be susceptible to IASCC.

The top guide grid must be removed if it becomes necessary to replace the top guide or the core plate. In some known BWRs, however, the grid is integral with the upper shroud assembly. Therefore, the grid cannot be replaced without removing the entire upper shroud assembly. Removing the entire upper shroud assembly requires removing approximately 90 stud/nut/keeper assemblies and disconnecting two to four core spray piping lines.

Other known BWRs have removable top guide grids. Specifically, the grid is secured to other components of the shroud assembly by bolted joints. Vertical loads are carried by the preload of the bolts, and horizontal loads are carried by shear pins and/or friction in the joint. Assembling such top guides is a tedious and time consuming task. Specifically, the grid must be accurately aligned so that the shear pins can be properly positioned, and each bolt must be torqued to the required pre-load.

It would be to desirable to provide a top guide grid which can be easily removed and replaced. It also would be desirable to provide such a grid which is easy to install.

SUMMARY OF THE INVENTION

These and other objects may be attained by a top guide assembly for securing a top guide to a shroud which enables the top guide to be remotely removed without removing any other parts of the shroud or the core support structure. More specifically, and in accordance with one embodiment, the top guide assembly includes a hanger for being secured in a groove formed in an inner surface of the shroud, and the hanger includes a ledge having a plurality of openings therein. The top guide rests on an upper surface of the hanger ledge. The assembly also includes wedges for being positioned in pockets formed in the top guide and tightly fit between the hanger and the top guide, and threaded studs that extend through respective aligned bores in the wedges and thread into the hanger ledge. A nut and a keeper are engaged to one end of each stud and retain the wedge in the pockets of the grid.

Vertical support for the top guide is provided by the groove machined on the inside surface of the shroud, and no flange or ledge in the shroud is required to vertically support the top guide. Therefore, the inside surface of the shroud can be a constant diameter at the top guide interface. In addition, no threaded holes are required in the shroud since all threaded components are separate from the shroud and are removable. Also, wedges allow for horizontal alignment/positioning of the top guide and provide the horizontal load path from the top guide to the shroud. No alignment, eccentric or shear pins are required. Further, bolt preloading, as compared to known bolting methods, is minimized by the wedges.

DETAILED DESCRIPTION

Figure 1:
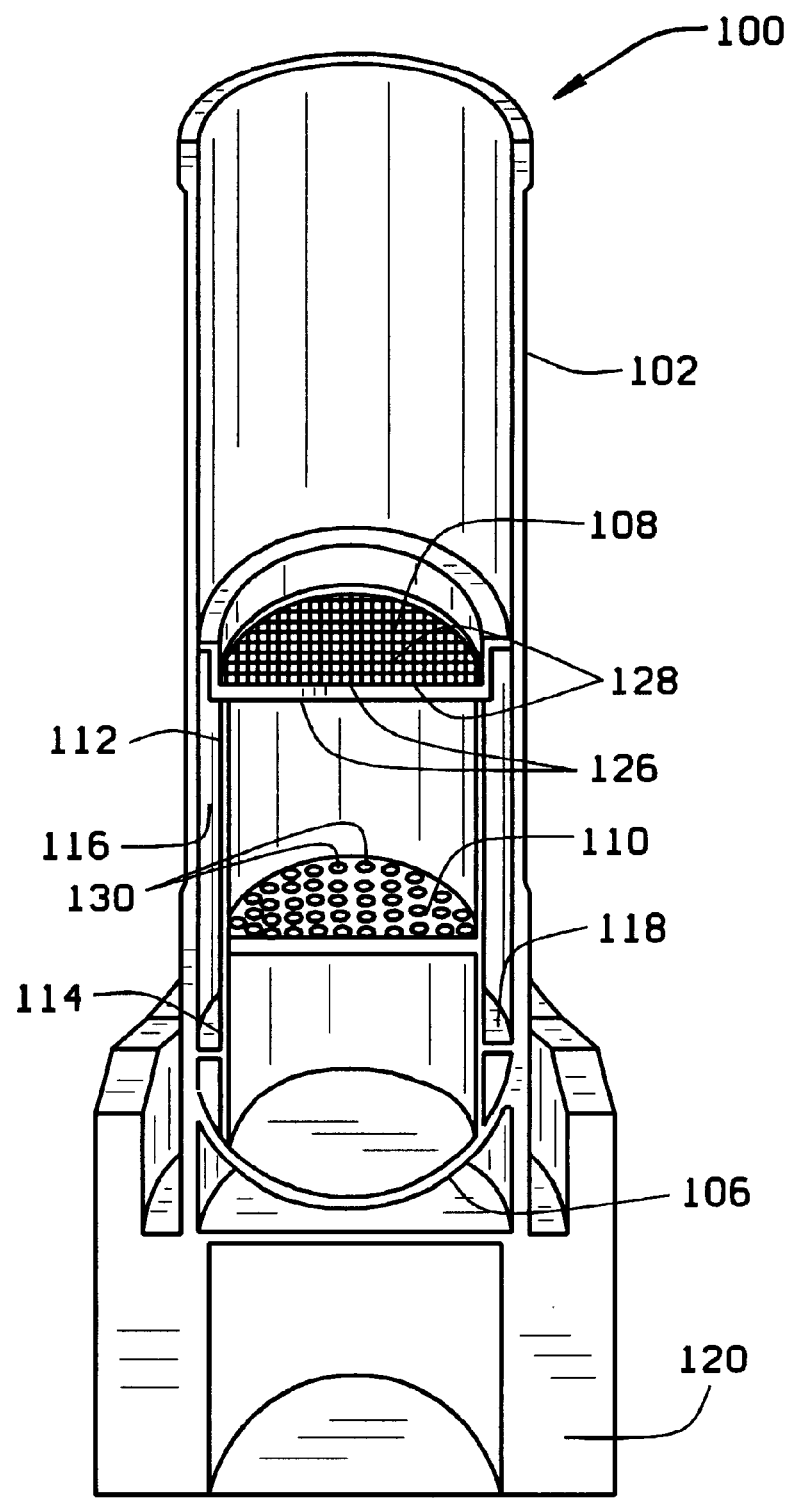
FIG. 1 is a schematic, partial cross section, illustration of a boiling water reactor including a reactor pressure vessel and a bridge.

FIG. 1 is a schematic, partial cross section, illustration of a boiling water reactor 100 including a reactor pressure vessel (RPV) 102 and a bridge (not shown). RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102.

RPV 102 is supported by an RPV support structure 120 and RPV 102 extends into an upper containment 122. Upper containment (not shown). The upper containment (not shown) and RPV 102 are, of course, filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically at the core plate by structure not shown.

Figure 2:
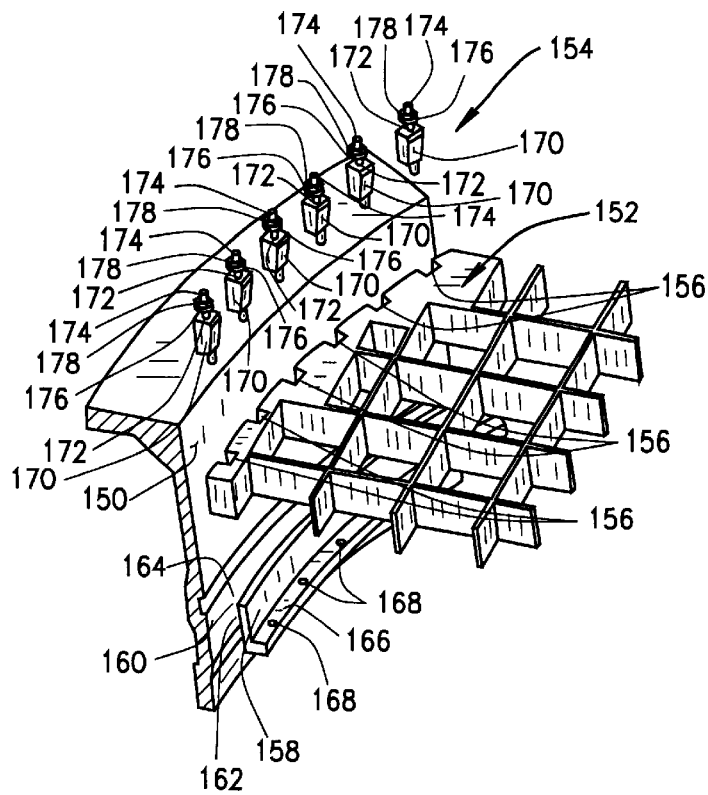
FIG. 2 is a perspective, partially exploded view of a portion of a shroud and a top guide including a top guide attachment assembly in accordance with one embodiment of the present invention.

FIG. 2 is a perspective, partially exploded view of a portion of a shroud 150 and a top guide 152 including a top guide attachment assembly 154 in accordance with one embodiment of the present invention. Top guide 152 has a plurality of pockets 156 at a periphery thereof, and assembly 154 includes a hanger 158 for being secured to shroud 150. Specifically, shroud 150 has a groove 160 therein, and hanger 158 includes a flange 162 for being inserted into groove 160. Hanger 158 has a shape selected to match the inside radius of inner surface 164 of shroud 150. Hanger 158 also includes a ledge 166 having a plurality of threaded openings 168 therethrough.

Assembly 154 also includes wedges 170 sized to tightly fit at least partially in respective pockets 156. Each wedge 170 has a bore 172 therethrough, and a stud 174 extends through wedge bore 172 and into one of threaded ledge openings 168. A nut 176 and a keeper 178 are engaged to one end of stud 174 to retain wedge 170.

Figure 3:
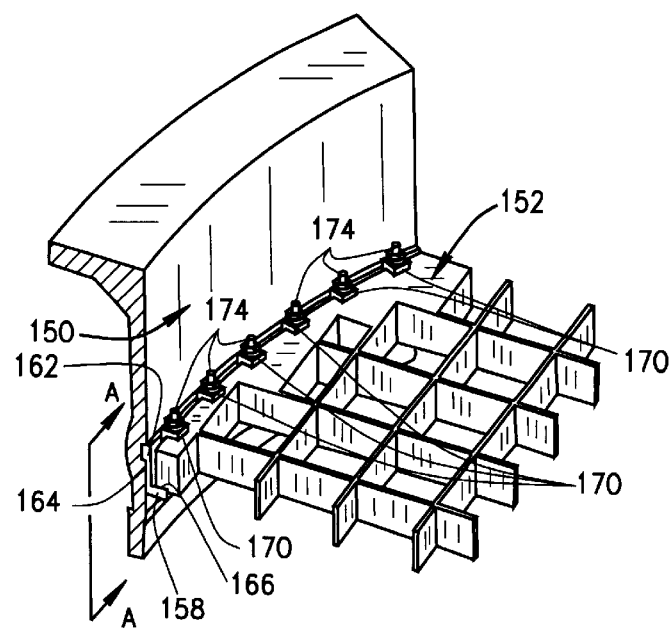
FIG. 3 is a perspective view of the shroud, top guide, and top guide attachment assembly shown in FIG. 2.

FIG. 3 is a perspective view of shroud 150, top guide 152, and top guide attachment assembly 154 shown in FIG. 2. As shown in FIG. 2, hanger 158 is installed into groove 160, and groove 160 provides vertical support for hanger 158. Grid 152 is set in place on ledge 166. Of course, more than one hanger 158 typically would be used to vertically support top guide 152, and it is contemplated that six hangers 158 radially spaced and engaged to shroud 150 may be used to support top guide 152.

Wedges 170 and studs 174 are installed into pockets 156 (FIG. 2) in top guide 152, and studs 174 are threadedly engaged to hanger 158 at openings 168. Wedges 170 can be adjusted to radially position grid 152, and preload on studs 174 applies a radially directed load from grid 152 through wedges 170 and hanger 158 to shroud 150.

Figure 4:
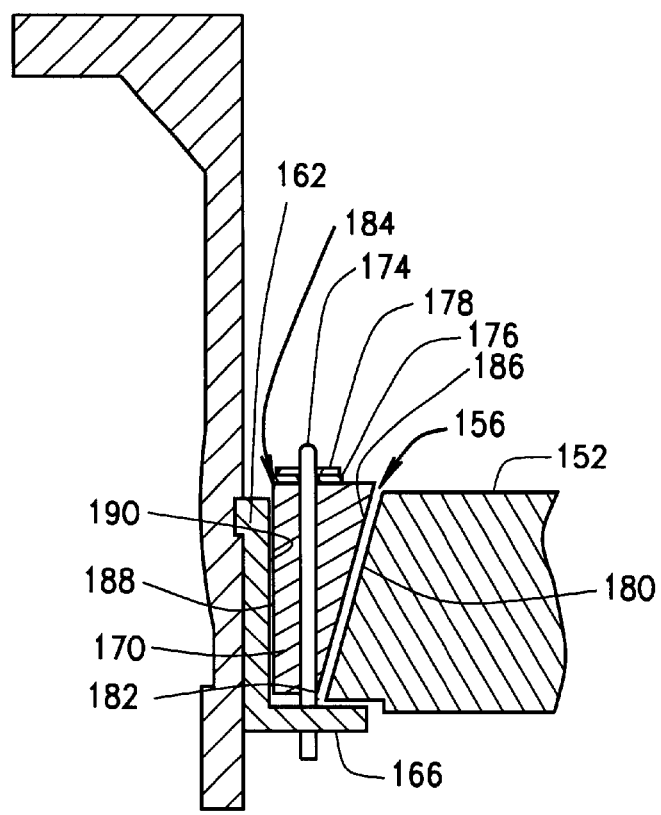
FIG. 4 is a cross-sectional view at a first location along line A—A shown in FIG. 3.

FIG. 4 is a cross-sectional view at a first location along line A—A shown in FIG. 3. As shown in FIG. 4, each pocket 156 has a wedge contacting surface 180 and wedge 170 includes a first end 182 and a second end 184. Wedge first end 182 has a surface area less than a surface area of wedge second end 184. Wedge 170 further includes a pocket contacting surface 186 between wedge first and second ends 182 and 184. Wedge 170 further includes a hanger contacting surface 188 between wedge first and second ends 182 and 184. Wedge 170 tightly fits between hanger 158 and pocket 156 so that wedge pocket contacting surface 186 is in tight contact with wedge contacting surface 180 of pocket 156 and wedge hanger contact surface 188 is in tight contact with a surface 190 of hanger 158.

Figure 5:
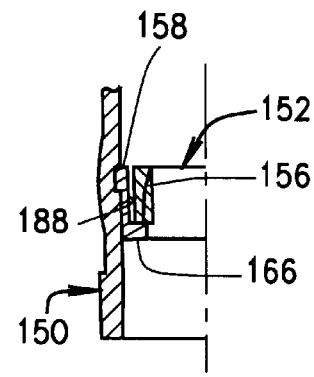
FIG. 5 is a cross-sectional view at a second location along line A—A shown in FIG. 3.

FIG. 5 is a cross-sectional view at a second location along line A—A shown in FIG. 3. As shown in FIG. 5, top guide 152 is spaced from hanger surface 188 and rests on hanger ledge 166. When wedge 170 (not shown in FIG. 5) is inserted into pocket 156, wedge 170 is trapped between top guide 152 and hanger side wall 188.

Figure 6:
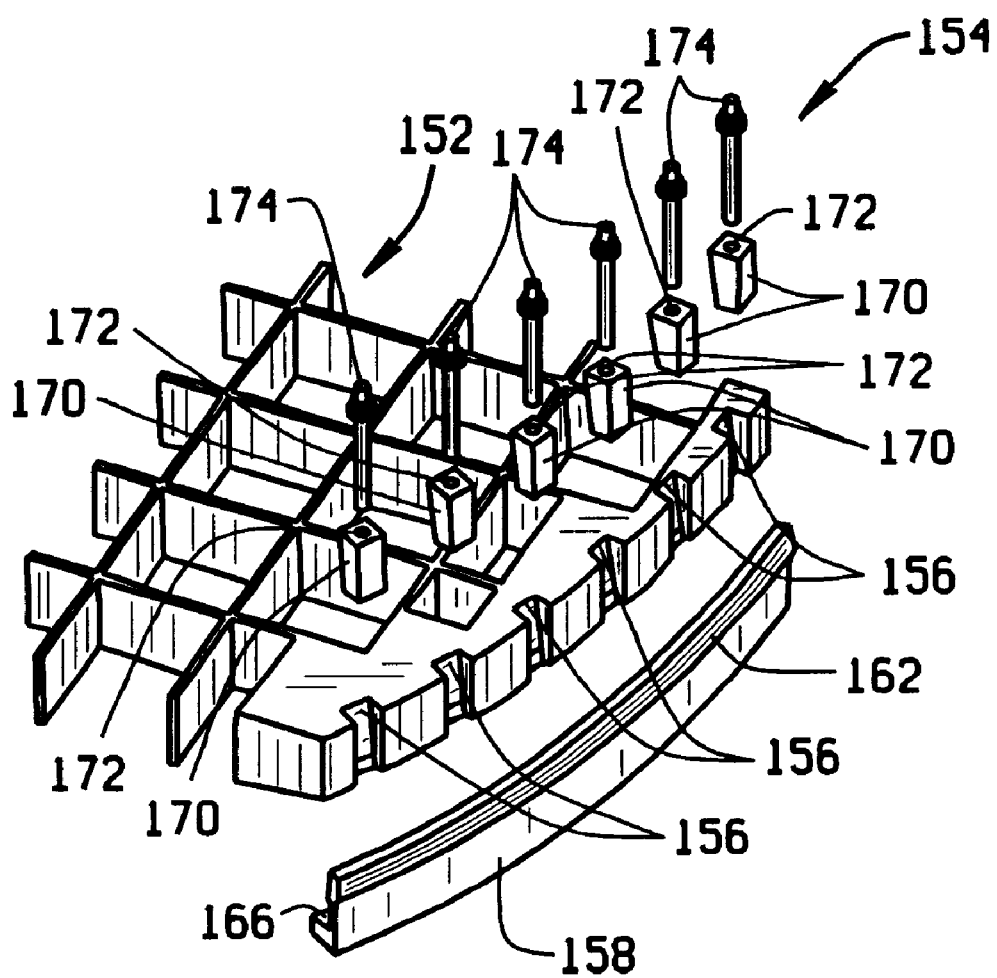
FIG. 6 is a perspective, fully exploded view of a portion of a top guide including one embodiment of the top guide attachment assembly.

FIG. 6 is a perspective, fully exploded view of a portion of top guide 152 and top guide attachment assembly 154. To secure top guide 152 to hanger 158, top guide 152 is positioned on ledge 166 of hanger 158. Wedges 170 are then inserted into pockets 156 so that wedge bores 172 align with respective openings 168 (shown in FIG. 2) in ledge 166. Studs 172 are then inserted through aligned bores 172 and openings 168 and are threadedly engaged to hanger 158.

The above described assembly permits the top guide to be remotely removed without removing any other parts of the shroud or the core support structure. Further, vertical support is provided by the groove machined on the inside surface of the shroud, and no flange or ledge in the shroud is required to vertically support the top guide. Therefore, the inside surface of the shroud can be a constant diameter at the top guide interface. In addition, no threaded holes are required in the shroud since all threaded components are separate from the shroud and are removable. Also, the wedges allow for horizontal alignment/positioning of the top guide and provide the horizontal load path from the top guide to the shroud. No alignment, eccentric or shear pins are required. Further, bolt preloading, as compared to known bolting methods, is minimized by the wedges.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A top guide attachment assembly for attaching a top guide to a shroud of a boiling water reactor, the top guide having a plurality of pockets at a periphery thereof, said attachment assembly comprising:

a shroud comprising a circumferential groove in an inner surface;

a hanger for being secured to the shroud, said hanger comprising a flange and a ledge having a plurality of threaded openings therethrough, said flange configured to be inserted into and to engage said groove;

a wedge sized to tightly fit between one of the pockets of the top guide and said hanger, said wedge having a bore therethrough; and a stud for extending through said wedge bore and into threaded engagement with one of said ledge openings.

2. A top guide attachment assembly in accordance with claim 1 wherein each pocket has a wedge contacting surface and said wedge comprises a first end and a second end, said wedge first end having a surface area less than a surface area of said wedge second end.

3. A top guide attachment assembly in accordance with claim 2 wherein said wedge further comprises a pocket contacting surface between said wedge first and second ends.

4. A top guide attachment assembly in accordance with claim 3 wherein said wedge further comprises a hanger contacting surface between said wedge first and second ends.

5. A top guide attachment assembly in accordance with claim 4 wherein said wedge tightly fits between said hanger and the pocket so that said wedge pocket contacting surface is in contact with the wedge contacting surface of the pocket and said wedge hanger contact surface is in contact with a surface of said hanger.

6. A top guide attachment assembly in accordance with claim 1 further comprising a nut and a keeper engaged to one end of said stud.

7. A method for attaching a top guide to a shroud in a nuclear reactor, the top guide having a plurality of pockets at a periphery thereof, the shroud having a circumferential groove in an inner surface, a top guide attachment assembly provided for performing such attaching and including a hanger having a ledge with a plurality of threaded openings therethrough, wedges having bores therethrough, and studs, said method comprising the steps of:

securing the hanger to the shroud groove;

placing the top guide on the hanger ledge;

inserting the wedges into respective pockets of the top guide; and extending the studs through respective wedge bores and into threaded engagement with the hanger ledge openings.

8. A method in accordance with claim 7 wherein the hanger includes a flange, and securing the hanger to the shroud groove comprises the step of inserting the hanger flange into the groove of the shroud.

9. A method in accordance with claim 7 wherein each wedge is sized to tightly fit between the hanger and one of the pockets of the top guide, and said method further comprises the step of attaching a nut to a stud to retain the wedge in place.

10. A top guide attachment assembly in accordance with claim 1 comprising a plurality of hangers radially spaced apart.

11. A method in accordance with claim 8 wherein the top guide attachment assembly comprises a plurality of hangers radially spaced apart, and securing the hanger to the shroud groove comprises the step of inserting the hanger flange of each hanger into the groove of the shroud.

\* \* \* \* \*

UNITED STATES PATENT AND TRADEMARK OFFICE
CERTIFICATE OF CORRECTION

PATENT NO. : 6,240,156 B1
DATED : May 29, 2001
INVENTOR(S) : Matsumoto et al.

It is certified that error appears in the above-identified patent and that said Letters Patent is hereby corrected as shown below:

Column 2,
Line 58, delete "122. Upper containment."

Signed and Sealed this

Eleventh Day of December, 2001

Attest:

NICHOLAS P. GODICI
*Attesting Officer*     *Acting Director of the United States Patent and Trademark Office*